US008685170B2

(12) United States Patent  
Cantrell et al.

(10) Patent No.: US 8,685,170 B2  
(45) Date of Patent: Apr. 1, 2014

(54) PRODUCE WASHER AND METHOD FOR CONTINUOUS MOTION WASHING MACHINE

(75) Inventors: John Cantrell, Leawood, KS (US); Mark Churchill, Grain Valley, MO (US)

(73) Assignee: Unified Brands, Inc., Jackson, MI (US)

( * ) Notice: Subject to any disclaimer, the term of this patent is extended or adjusted under 35 U.S.C. 154(b) by 410 days.

(21) Appl. No.: 12/842,984

(22) Filed: Jul. 23, 2010

(65) Prior Publication Data

US 2011/0174339 A1 Jul. 21, 2011

Related U.S. Application Data

(60) Provisional application No. 61/228,007, filed on Jul. 23, 2009.

(51) Int. Cl.
*B08B 9/20* (2006.01)
(52) U.S. Cl.
USPC ....... 134/25.1; 134/25.2; 134/25.3; 134/25.4; 134/34
(58) Field of Classification Search
None
See application file for complete search history.

(56) References Cited

U.S. PATENT DOCUMENTS

| | | | |
|---|---|---|---|
| 4,685,481 | A | 8/1987 | Carlson et al. |
| 4,773,436 | A | 9/1988 | Cantrell et al. |
| 5,562,114 | A | 10/1996 | St. Martin |
| 2003/0041886 | A1 | 3/2003 | Cantrell et al. |
| 2003/0041887 | A1 | 3/2003 | Inch et al. |
| 2004/0244822 | A1 | 12/2004 | Cantrell et al. |
| 2011/0017241 | A1 | 1/2011 | Cantrell et al. |

OTHER PUBLICATIONS

Written Opinion of International Search Authority for PCT/US2010/043163, mailed Sep. 16, 2010.

*Primary Examiner* — Eric Golightly  
(74) *Attorney, Agent, or Firm* — Kutak Rock LLP; Bryan P. Stanley

(57) ABSTRACT

A produce washer and method of washing produce or other items in a continuous motion washing machine is provided. The produce washer includes a basket, or other collector, that is positioned within a portion of the fluid flow path and sized and shaped to intercept items from a the fluid flow path while at the same time allowing the fluid to continue to flow through a perforated wall in the collector generally in the same circulatory flow path created by the washing machine. The method includes placing items within the wash tank; creating a fluid flow within the wash tank; intercepting one or more of the items from the fluid flow path by the collector; and allowing the fluid to continue flow through the perforated wall in the collector.

12 Claims, 6 Drawing Sheets

PRODUCE WASHER AND METHOD FOR CONTINUOUS MOTION WASHING MACHINE

CROSS-REFERENCE TO RELATED APPLICATIONS

This application claims priority pursuant to 35 U.S.C. 119(e) to co-pending U.S. Provisional Patent Application Ser. No. 61/228,007, filed Jul. 23, 2009, the entire disclosure of which is incorporated herein by reference.

FIELD OF THE INVENTION

The present invention relates to a produce washer and methods of washing produce or other items. More particularly, the present invention relates to a produce washer and methods of washing produce or other items in a continuous motion washing machine.

BACKGROUND OF THE INVENTION

Continuous motion pot and pan washing machines, of the type used in restaurants, institutions and other eating facilities often involve a large wash tank or basin in which wash fluid is circulated to provide a rolling wash action for the pots and pans. One such machine is described in U.S. Pat. No. 4,773,436 issued to Cantrell et al., the entire disclosure of which is incorporated herein by reference. The machine of Cantrell includes a wash tank with multiple jets evenly spaced apart at an elevated position along the rear wall of the wash tank. The tank is filled with water (wash fluid) to a level above the position of the jets. Pots and pans are placed in the wash tank, and a pump is activated to draw fluid from within the wash tank and direct it through the jets to create a jet stream. Each jet directs its jet stream toward the bottom wall of the wash tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling washing action within the wash tank.

The basic components of the wash tank of an exemplary pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. In the embodiment shown in FIG. 1, the impeller draws fluid into pump inlet 52 through an intake port (not shown) located in end wall 14. The fluid is then discharged from the pump through pump outlet 54 and into outlet manifold 60. Outlet manifold 60 includes a ninety degree turn, and several other turns, to direct the fluid across the back side of rear wall 16 and out jet nozzles 20 which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional wash action, many of the components discussed above hinder the overall efficiency and performance of the machine. The inventions disclosed in U.S. application Ser. Nos. 09/947,484, 09/947,485, and 10/744,666, the entire disclosures of which are incorporated herein by reference, provide components that greatly increase the overall efficiency and performance of the machine, including improvements to the intake and discharge manifolds, jets, pump and system assembly methods. Nevertheless, prior to the advent of the instant invention, continuous motion washing machines such as are described above have not generally been utilized for washing small edible items such as produce. Unloading small items such as produce from the wash tank of a continuous motion washing machine is often difficult and time consuming, and typically requires suspension of the wash action while unloading. As a result, such items are typically washed either by hand, or in large specialized produce washing machines in which the produce is submerged in water (or other washing fluid) and moved out of the fluid via a conveyor that moves through the fluid. Washing by hand can be time consuming and inefficient for large amounts of produce. Conveyor-belt type produce washing systems are extremely large and expensive, and therefore only practical for extremely high volumes of produce. Thus, it would be beneficial to provide a device and method for washing produce of moderately large volumes of produce in an efficient and effective manner.

SUMMARY OF THE INVENTION

The instant inventions provide a produce washer for and methods of washing produce or other items in continuous motion wash tank style machines such as the pot and pan washing machines described in any of U.S. Pat. No. 4,773,436, or U.S. application Ser. Nos. 09/947,484, 09/947,485, 10/744,666, 12/430,724, 12/765,838 (the entire disclosures of which are incorporated herein by reference). It will be appreciated that other washing machines, or various combinations of washing machine components may be utilized without departing from the spirit and scope of the instant invention.

The produce washer assembly of the instant invention is mounted within the wash tank of a continuous motion washing machine, such as any of those described above. In a preferred embodiment, the continuous motion washing machine includes discharge jets and an intake along the rear wall of the wash tank. In another preferred embodiment, the produce washer assembly includes a pair of partitioning walls (or a single partitioning wall, if located at one of the ends of the wash tank) to subdivide a section of the wash tank for washing produce, and one or more basket(s) (or other suitable collectors) supported by the partitioning wall(s) and/or the end walls of the wash tank.

In one preferred embodiment, the partitioning walls are removably supported within voids created between two adjacent flow guide structures within the wash tank as is further described in U.S. application Ser. No. 12/765,838, filed on Apr. 22, 2010, the entire disclosure of which is incorporated herein by reference. In another embodiment, each partitioning wall is held in position within the wash tank via a pair of removable support brackets that include rails or a slot in which the partition is retained. In yet other embodiments, each portioning wall is held in position by non-removable supports, such as rails or channels welded to the walls of the wash tank.

The produce basket includes a generally open front face and a top connected to the front face of the basket. Two cross members that function as handles for the basket, as well as providing a rigid framework for the basket, extend across the front face/top portions of the basket. The basket includes a pair of side walls extending from the front face toward a rear wall, a bottom wall, and, in a preferred embodiment, an intermediate angled wall connecting the bottom and rear walls. The intermediate angled wall is angled to prevent interference with the jet stream created by the discharge jet(s) located along the rear wall (or other wall) of the wash tank. A pair of support/pivot pins protrudes from each of the side walls. The support pins support that basket on top of the partitioning walls. In a preferred embodiment, the position of the support pins and the size and shape of the basket is designed to be slid from the rear to the front of the wash tank, or vice versa, along the walls on which the basket is supported. In another embodiment, the position of the support pins and size and shape of the basket allow the basket to be rotated about one pair of opposing pins (i.e. the front or rear set of pins—one pin from each set on each side of the basket).

The bottom wall of the basket includes perforations or other openings to allow the flow of fluid within the wash tank to flow through the bottom wall of the basket generally with minimal disruption to the continuous recirculating motion created within the wash tank and/or to substantially maintain the velocity of the recirculating fluid flow. In a preferred embodiment, the intermediate angled wall between the rear wall and the bottom wall of the support basket is angled to allow the jet stream created by the discharge jet of the washing machine to flow generally in the manner/direction designed for the washing machine. In one such embodiment, the intermediate angled wall allows the jet stream to flow generally in the manner/direction designed, but also at least slightly reduce or compress the cross-sectional area of the flow path, resulting in increased velocity of the fluid flow. In some preferred embodiments, the intermediate angled wall includes perforations, openings, holes, etc. to further minimize disruptions of the recirculating motion within the wash tank. In other preferred embodiments, any or all of the side and rear walls are also perforated (or otherwise include holes/flow channels).

In operation, produce (or other items) is placed in the partitioned section of the wash tank, and the washing machine is allowed to run creating a recirculating wash action within the wash tank. When a user desires to remove the produce/items from the wash tank, the basket is set into the partitioned section of the wash tank, with the support/pivot pins supporting the basket on top of the partitioning walls while the recirculating wash action is allowed to continue. The rolling or recirculating washing action of the washing machine washes the produce (when the basket is removed), and also urges the produce (which often floats, or otherwise is caused to "float" as it is brought into motion within the flow of fluid) into the open front face of the basket. The perforated bottom wall allows the rolling washing action to continue through the produce basket. Once the produce has collected in the basket, the basket is slid forward toward the front of the wash tank and lifted upward and removed from the wash tank to "scoop" the produce from the tank, typically while the rolling wash action of the wash tank continues. As the basket is slid forward, the angled intermediate wall acts to compress the cross-sectional area of the fluid flow between the wall and bottom of the wash tank (or surface of a fluid flow guide inserted into the wash tank). This increases the flow velocity as the basket is pulled forward, reduces eddies toward the bottom of the basket (which in preferred embodiments is generally located near the center axis of rotation of the recirculating flow path within the wash tank), and changes the trajectory of items moving within the flow. In one preferred embodiment, the bottom wall of the basket is slightly curved to correspond generally to curvature of a flow guide in the wash tank and further reduce eddies within the wash tank. In embodiments in which the fluid flow recirculates or rolls about a horizontal axis within the wash tank, the trajectory results in propelling the rotating items higher toward the top of the opening of the basket, allowing such items to stack on top of items already located in the bottom of the basket.

It will be appreciated that the basket may be used also to place produce into the wash tank. In addition, it will be appreciated that the produce basket may be removed from the wash tank while the produce is being washed, and inserted into the wash tank when it is desired to remove the produce from the wash tank, providing an effective automatic self-filling basket. This feature is achieved because of the basket design combined with the unique rolling/recirculating washing action of the continuous motion washing machines of the type described above.

The basket is sized and shaped to intercept at least a portion of the fluid flow path through the opening of the basket, allowing the perforated bottom to remove items from the fluid flow while at the same time allowing the fluid to continue to flow through the bottom generally in the same circulatory flow path created by the washing machine. In this manner, the produce will be washed by the rolling (circulating) wash action within the partitioned section of the wash tank in the same or similar manner to pots, pans, utensils and other items that are typically washed within the wash tank. When the basket is placed in the wash tank it is used to "scoop" the produce out of the tank in the manner discussed above. In a preferred embodiment, the basket intercepts a portion of the fluid flow path located generally along a portion of the flow path only along a single direction of the fluid flow path, such that the basket generally does not extend across the center axis of rotation of the fluid flow path. Nevertheless, it will be appreciated that the basket may extend slightly beyond the center axis of rotation without departing from the spirit and scope of the instant invention. In a preferred embodiment, however, any such extension is minimal so as to not interfere with the recirculating flow and momentum of such flow.

Although described above as a basket, in alternative embodiments of the instant invention, the collector comprises a generally planar perforated surface. The planar collector is positioned within the flow in the same manner described above to collect items.

In some embodiments of the instant invention, the recirculating wash action within the wash tank rotates about a horizontal axis of rotation within the wash tank to create a rolling wash action. In one such embodiment, the collector is positioned toward the top of the wash tank with the portion of the fluid flow path moving in a direction across the top of the wash tank. In such an embodiment, the produce or other items are pushed upward and into or onto the collector by the fluid flow. In other embodiments, the recirculating wash action rotates about a vertical axis of rotation within the wash tank.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

Figure 1:
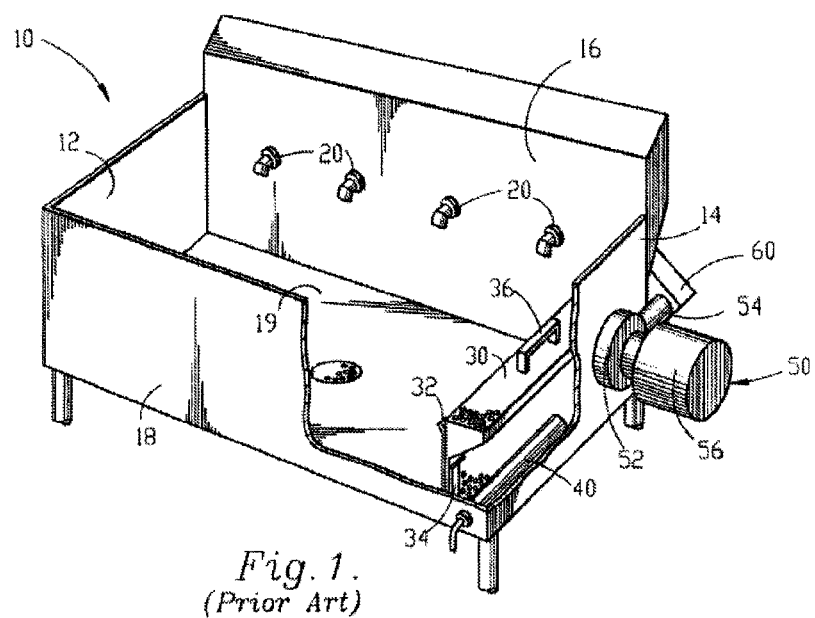
FIG. 1 is a partial perspective view of a continuous motion washing machine of the prior art in which embodiments of the instant invention may be incorporated.
Figure 2:
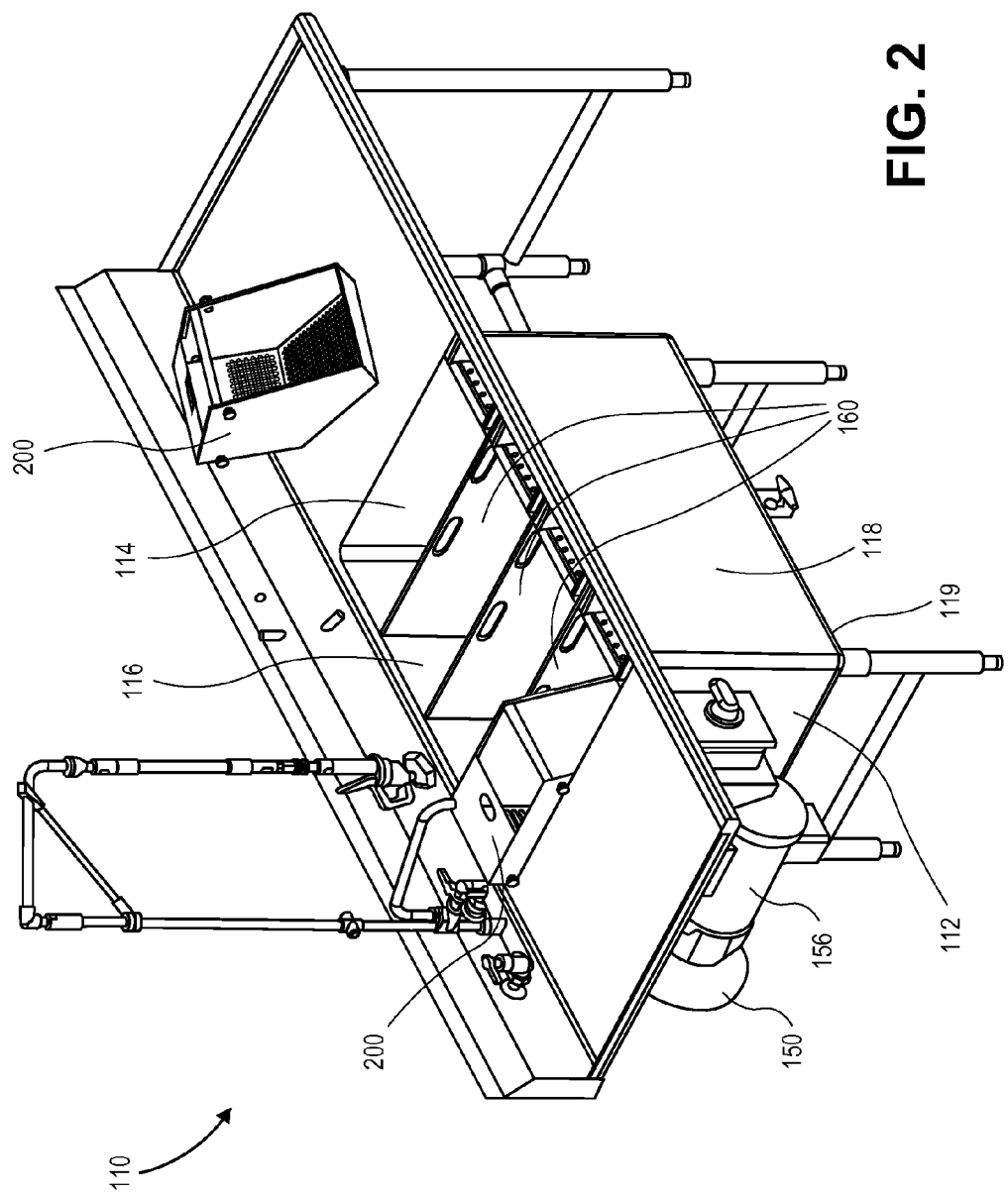
FIG. 2 is a front perspective view of a washing machine of an embodiment of the instant invention.
Figure 3:
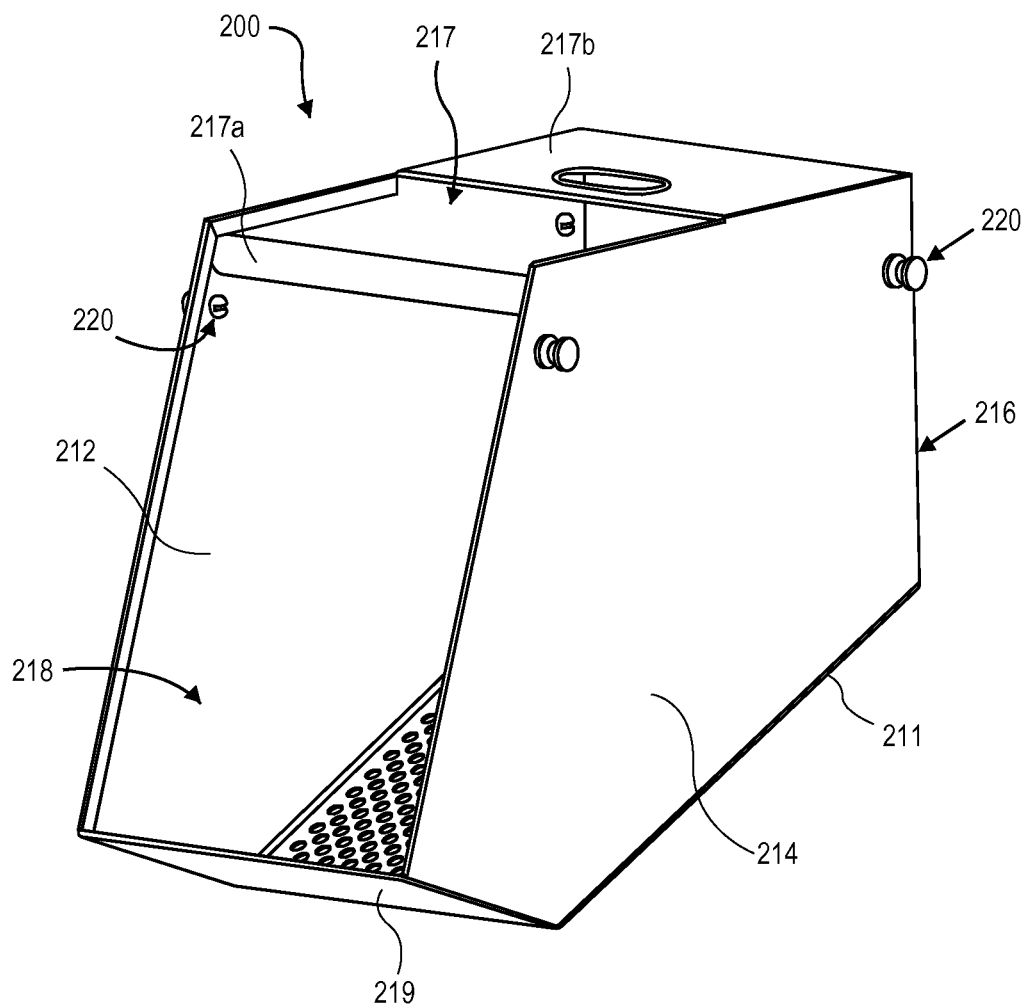
FIG. 3 is a perspective view of a produce basket collector of the washing machine of FIG. 2.
Figure 4:
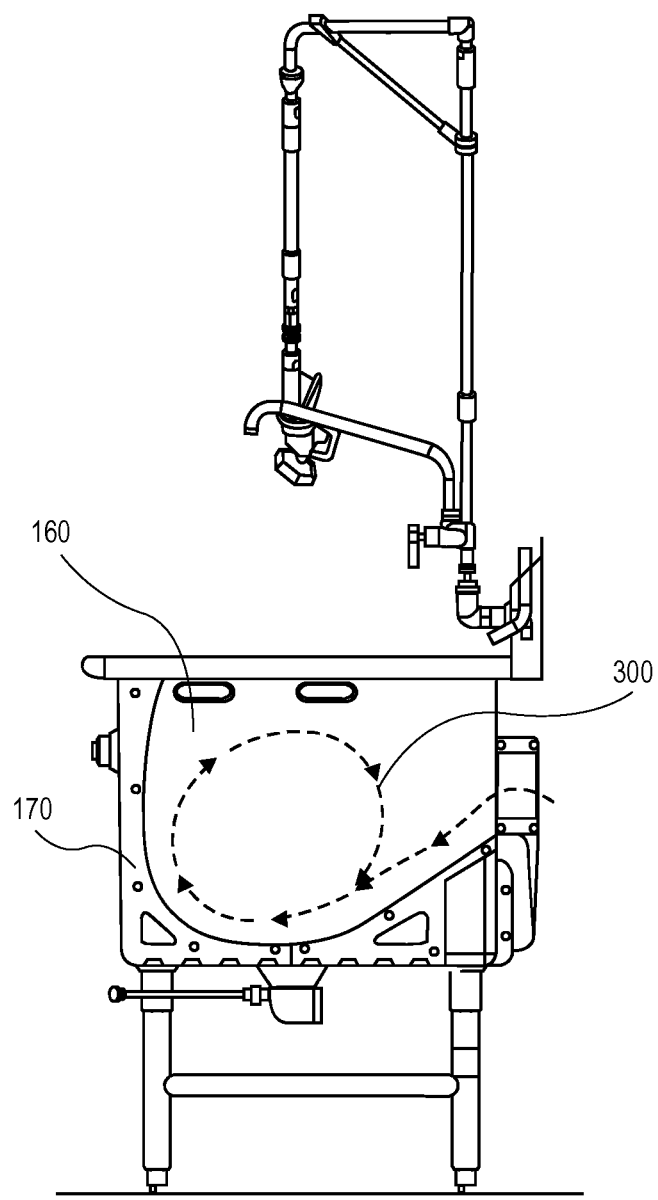
FIG. 4 is a sectional view of the washing machine of FIG. 2 with collector(s) removed.
Figure 5:
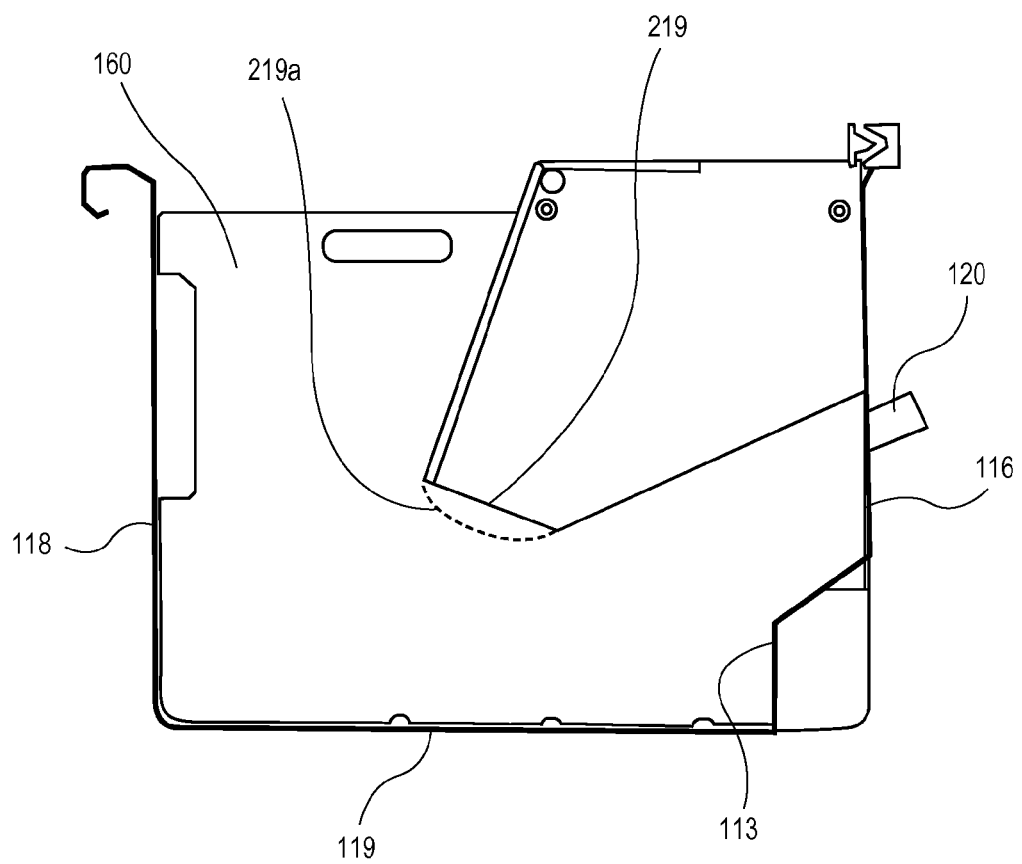
FIG. 5 is a sectional view of the washing machine of FIG. 2 with a basket-type collector and with flow guide inserts removed.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 2 through 5, a preferred embodiment of a washing machine of the instant invention is shown, which is particularly useful for washing vegetables. Washing machine 110 includes a wash tank including end walls 112 and 114, rear side wall 116, front side wall 118 and bottom wall 119. A pump can be attached to either end wall; in the embodiment shown in FIG. 2, pump 150 is attached to left end wall 112. An impeller located within pump 150 is driven by electric motor 156. In the embodiment shown in FIG. 2, the impeller draws fluid into a pump inlet through an intake port (not shown) located in end wall 112 that is associated with a perforated intake grate 113 (shown in FIG. 5). The fluid is then discharged from the pump through a pump outlet and into an outlet manifold. The outlet manifold directs the fluid across the back side of rear wall 116 and out jet nozzles 120 which go through and are flush mounted to the inner surface of rear wall 116.

In the embodiment shown in FIGS. 2-5, the produce washer assembly includes partitioning walls 160 to subdivide sections of the wash tank for washing produce, and baskets 200 supported by the partitioning walls and/or the end walls of the wash tank, as the case may be. The partitioning walls of the embodiment shown are removably supported within voids created between two adjacent flow guide structures 170 within the wash tank as is further described in U.S. application Ser. No. 12/765,838, filed on Apr. 22, 2010, the entire disclosure of which is incorporated herein by reference.

The produce basket 200 includes a generally open front face 218 and a top 217 connected to the front face of the basket. Two cross members (217a and 217b) that function as handles for the basket, as well as providing a rigid framework for the basket, extend across the front face/top portions of the basket. The basket includes a pair of side walls 212 and 214 extending from the front face toward a rear wall 216, a bottom wall 219, and, in a preferred embodiment, an intermediate angled wall 211 connecting the bottom and rear walls. The intermediate angled wall is angled to prevent interference with the jet stream created by the discharge jet(s) located along the rear wall (or other wall) of the wash tank. A pair of support/pivot pins 220 protrude from each of the side walls. The support pins support that basket on top of the partitioning walls. The position of the support pins and the size and shape of the basket are such that the basket can be slid from the rear to the front of the wash tank, or vice versa, along the walls on which the basket is supported.

The bottom wall of the basket includes perforations to allow the flow of fluid within the wash tank to flow through the bottom wall of the basket generally with minimal disruption to the continuous recirculating motion 300 created within the wash tank and/or to substantially maintain the velocity of the recirculating fluid flow. The intermediate angled wall between the rear wall and the bottom wall of the support basket is angled to allow the jet stream created by the discharge jet of the washing machine to flow generally in the manner/direction designed for the washing machine. In the shown embodiment, the intermediate angled wall allows the jet stream to flow generally in the manner/direction designed, but also at least slightly reduce or compress the cross-sectional area of the flow path 300, resulting in increased velocity of the fluid flow. In the embodiment shown intermediate angled wall includes perforations, openings, holes, etc. to further minimize disruptions of the recirculating motion within the wash tank.

In operation, produce (or other items) is placed in the partitioned section of the wash tank, and the washing machine is allowed to run for a period of time creating a recirculating wash action within the wash tank to wash the items. When a user desires to remove the produce/items from the wash tank, the basket is set into the partitioned section of the wash tank, with the support/pivot pins supporting the basket on top of the partitioning walls while the recirculating wash action is allowed to continue. The rolling or recirculating washing action of the washing machine washes the produce (when the basket is removed), and also urges the produce (which often floats, or otherwise is caused to "float" as it is brought into motion within the flow of fluid) into the open front face of the basket. The perforated bottom wall allows the rolling washing action to continue through the produce basket. Once the produce has collected in the basket, the basket is slid forward toward the front of the wash tank and lifted upward and removed from the wash tank to "scoop" the produce from the tank, typically while the rolling wash action of the wash tank continues. As the basket is slid forward, the angled intermediate wall acts to compress the cross-sectional area of the fluid flow between the wall and bottom of the wash tank (or surface of a fluid flow guide inserted into the wash tank). This increases the flow velocity as the basket is pulled forward, reduces eddies toward the bottom of the basket (which in preferred embodiments is generally located near the center axis of rotation of the recirculating flow path within the wash tank), and changes the trajectory of items moving within the flow. In one preferred embodiment, the bottom wall of the basket is slightly curved (shown in FIG. 5 in broken lines as bottom wall 219a) to correspond generally to curvature of a flow guide in the wash tank and further reduce eddies within the wash tank. In the shown embodiment fluid flow recirculates or rolls about a horizontal axis within the wash tank. The trajectory results in propelling the rotating items higher toward the top of the opening of the basket, allowing such items to stack on top of items already located in the bottom of the basket.

It will be appreciated that the basket may be used also to place produce into the wash tank. In addition, it will be appreciated that the produce basket may be removed from the wash tank while the produce is being washed, and inserted into the wash tank when it is desired to remove the produce from the wash tank, providing an effective automatic self-filling basket. This feature is achieved because of the basket design combined with the unique rolling/recirculating washing action of the continuous motion washing machines of the type described above.

The basket is sized and shaped to intercept at least a portion of the fluid flow path through the opening of the basket, allowing the perforated bottom to remove items from the fluid flow while at the same time allowing the fluid to continue to flow through the bottom generally in the same circulatory flow path created by the washing machine. In this manner, the produce will be washed by the rolling (circulating) wash action within the partitioned section of the wash tank in the same or similar manner to pots, pans, utensils and other items that are typically washed within the wash tank. When the basket is placed in the wash tank it is used to "scoop" the produce out of the tank in the manner discussed above. In a preferred embodiment, the basket intercepts a portion of the fluid flow path located generally along a portion of the flow path only along a single direction of the fluid flow path, such that the basket generally does not extend across the center axis of rotation of the fluid flow path. Nevertheless, it will be appreciated that the basket may extend slightly beyond the center axis of rotation without departing from the spirit and scope of the instant invention. In a preferred embodiment, however, any such extension is minimal so as to not interfere with the recirculating flow and momentum of such flow.

Figure 6:
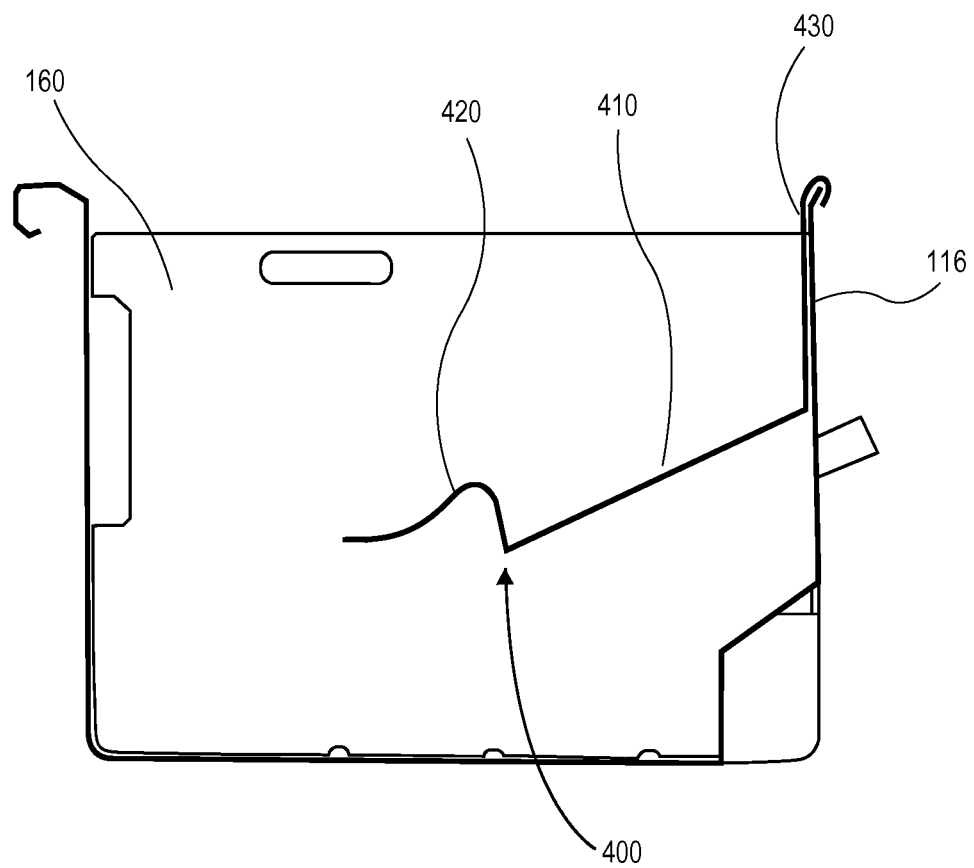
FIG. 6 is a sectional view of the washing machine of FIG. 2 with a planar-type collector and with flow guide inserts removed.

Referring to FIG. 6 an alternative embodiments of the instant invention is shown in which basket 300 is replaced with a generally planar collector 400 comprises a generally planar perforated surface 410. The planar collector is positioned within the flow in the same manner described above to collect items. In the embodiment shown in FIG. 6, the planar collector 400 includes a ramped surface 420 that extends upward from planar surface 410 and back downward toward the bottom of the wash tank. The ramped surface aides in scoping of larger items from the fluid flow. The upward extension of the ramped surface 420 from the planar surface 410 creates a ledge or pocket in which items collected on the planar surface 410 will be deposited and prevented or discouraged from falling back into the wash tank. In the embodiment shown in FIG. 6, collector 400 is attached to the rear wall 116 of the wash tank by member 430 which extends from the rear of planar surface 410 upward and hooks around the top of rear wall 116. It will be appreciated that alternative mounts for planar surface will be readily apparent to those of ordinary skill in the art, including but not limited to support members extending over the top edges of partitions 160, hinge connectors to the rear wall 116, and the like.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of washing items within a continuous motion washing machine, the method comprising the steps of:
    placing one or more items within a wash tank of a continuous motion washing machine;
    creating a recirculating fluid flow path within said wash tank;
    allowing said one or more items to be brought into recirculating motion for a period of time within said fluid flow path;
    positioning after said period of time a collector including a perforated wall within a portion of said fluid flow path;
    intercepting said one or more items from said fluid flow path by said collector; and
    allowing said fluid flow path to flow through said perforated wall generally in said circulating flow path created in said creating step.

2. The method as claimed in claim 1 further comprising the steps of partitioning said wash tank with a tank divider and supporting at least one side of said collector with said tank divider.

3. The method as claimed in claim 2 further comprising the step of removably supporting said tank divider within said wash tank.

4. The method as claimed in claim 3 wherein said step of removably supporting said tank divider comprises holding the divider within a void created between two adjacent flow guide structures within said wash tank.

5. The method as claimed in claim 1 wherein in said positioning step said collector is positioned within a portion of said fluid flow path generally only along a single direction of said fluid flow path such that said collector generally does not extend across the axis of rotation of said fluid flow path.

6. The method as claimed in claim 1 wherein said perforated wall comprises a bottom wall, and wherein said collector further comprises a front wall, two side walls and a top wall.

7. The method as claimed in claim 6 wherein said front wall includes an opening to said collector.

8. The method as claimed in claim 6 wherein said collector further comprises an intermediate wall between said bottom wall and said top wall, said intermediate wall including an angle that corresponds generally to an angle of a fluid-flow producing nozzle of said wash tank.

9. The method as claimed in claim 8 wherein said intermediate wall is perforated.

10. The method as claimed in claim 6 wherein each of said side walls includes a support pin protruding generally transverse to said side wall.

11. The method as claimed in claim 1 wherein said collector is positioned at an angle that corresponds generally to an angle of a fluid-flow producing nozzle of said wash tank, further comprising the steps of:
   pulling said collector forward from a generally rearward position of said wash tank to a generally forward position of said wash tank; and
   compressing generally a cross-sectional area of said fluid flow path to increase velocity of said fluid flow as a result of said pulling step.

12. The method as claimed in claim 1 wherein said recirculating fluid flow path rotates generally about a horizontal axis of rotation to provide a rolling wash action within said wash tank.

* * * * *